United States Patent [19]

Panda et al.

[11] 4,370,422

[45] Jan. 25, 1983

[54] PROCESS FOR THE PRODUCTION OF MAGNESIUM OXIDE FROM BRINE OR BITTERN

[75] Inventors: Jajnya D. Panda; Santosh K. Mahapatra, both of Orissa, India

[73] Assignees: Dalmia Institute of Scientific and Industrial Research; Orissa Cement Limited, both of Orissa, India

[21] Appl. No.: 216,810

[22] Filed: Dec. 16, 1980

[30] Foreign Application Priority Data

Apr. 30, 1980 [GB] United Kingdom ................. 8014325

[51] Int. Cl.³ .............................................. C04B 9/14
[52] U.S. Cl. .................................... 501/108; 501/109; 501/117; 423/636
[58] Field of Search ............... 423/163, 164, 472, 636; 106/58, 106, 121, 59; 501/108, 109, 117

[56] References Cited

U.S. PATENT DOCUMENTS

| | | | |
|---|---|---|---|
| 2,999,759 | 9/1961 | Heuer | 106/59 |
| 3,232,708 | 2/1966 | Chisholm | 423/164 |
| 3,987,135 | 10/1976 | Eigner | 106/58 |
| 4,033,778 | 7/1977 | Gilpin | 106/58 |
| 4,035,469 | 7/1977 | Richmond | 423/164 |

FOREIGN PATENT DOCUMENTS 377199  6/1921  Fed. Rep. of Germany .

*Primary Examiner*—Brian E. Hearn
*Attorney, Agent, or Firm*—Fleit & Jacobson

[57] ABSTRACT

Magnesium oxide, especially suitable for use in basic refractories, is produced from brine or bittern containing magnesium chloride by:

(a) adding to the brine or bittern, as a source of MgO and/or CaO, MgO or Mg(OH)$_2$ or calcined magnesite or calcined dolomite or calcined calcite/limestone in such amount that in the case of MgO, Mg(OH)$_2$ or calcined magnesite, the molar ratio of MgO:MgCl$_2$ is in the range of 1:1.5 to 1:15 (i.e. 0.66:1 to 0.066:1) or, in the case of calcined dolomite, the molar ratio of MgO+CaO:MgCl$_2$ is in the range of 0.66:1 to 0.05:1, or, in the case of calcined calcite/limestone, the molar ratio of CaO:MgCl$_2$ is in the range of 0.66:1 to 0.1:1;

(b) keeping the mixture at a temperature below 90° C. till a solid mass is formed; and (c) drying the said solid mass at a temperature up to 200° C.

The said mass may then be calcined at a maximum temperature of 1200° C. and optionally then briquetted with a binder and fired at above 1400° C.

13 Claims, No Drawings

PROCESS FOR THE PRODUCTION OF MAGNESIUM OXIDE FROM BRINE OR BITTERN

The present invention relates to preparing magnesium oxide from brine or bittern containing magnesium chloride.

It has been well known to use $MgCl_2$ with MgO in the molar ratio of $MgCl_2$:MgO of 1:1 to 1:20 in the production of Sorel Cement since as early as 1867.

Since then various research works have been carried out for the production of magnesium oxychloride by adding MgO to aqueous solution of $MgCl_2.6H_2O$. In all these processes the molar proportion of MgO was in excess of $MgCl_2.6H_2O$.

N.L. Industries Inc. U.S.A. developed a process of producing $MgCl_2$. The brines are concentrated by solar evaporation, sodium and potassium salts are removed and the $MgCl_2$ concentration increased so as to give ultimately anhydrous $MgCl_2$. However there have been considerable engineering and mechanical difficulties in this process.

Processes have been under development in recent years for the production of magnesium oxide starting from aqueous solutions containing magnesium ions, for example sea water. These methods starting from sea water comprise the precipitation during a first stage of magnesium hydroxide and/or magnesium carbonate. In a recent attempt to produce $Mg(OH)_2$ directly from sea water calcined dolomite (CaO—MgO) was used as the precipitating agent, which reacts with the magnesium chloride in the sea water according to the reaction:

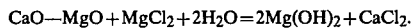

$$CaO—MgO + MgCl_2 + 2H_2O = 2Mg(OH)_2 + CaCl_2.$$

Even though this process gives the advantage of increasing the yield of magnesium hydroxide from a given volume of sea water, it still requires a large amount of dolomite, which one would like to avoid.

More recently the precipitation of $Mg(OH)_2$ from sea water has been studied using calcium carbide ($CaC_2$). This process proceeds in accordance with the following reaction:

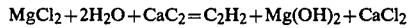

$$MgCl_2 + 2H_2O + CaC_2 = C_2H_2 + Mg(OH)_2 + CaCl_2$$

Although it allows acetylene to be obtained, it suffers from the disadvantage of requiring the use of a reagent (i.e. calcium carbide) which is costly and not always easily available. Furthermore, whatever method is used for precipitating the magnesium hydroxide from sea water on an industrial scale one major problem remains unsolved, namely the slow precipitation and filtration of the product obtained. Many attempts have been made to increase the speed of deposition and to obtain precipitates which are more easily filterable. Evidently a faster deposition and the formation of a more easily filterable precipitate would have the effect of considerably reducing operating costs. For this purpose, various methods have been tried such as recycling a portion of the slurry precipitated in the precipitation zone or continuously adding flocculating agent without however obtaining completely satisfactory results. On the other hand although the addition of small quantities of aldehydes to the magnesium brines has enabled a precipitate of better filtering characteristics to be obtained, it has been found that an improvement in the precipitation characteristics is obtained at the expense of purity of the final product because of contamination by the flocculating agents absorbed by the magnesium hydroxide.

U.S. Pat. No. 2,921,835 proposes the use of ammonium carbonate as the precipitating means for the magnesium ions from saline solutions. As the quantity of carbon dioxide is larger than that relative to the stoichiometric composition of ammonium carbonate would have to be used, the operation must be carried out under pressure or at low temperature in order to obtain good yields with industrially acceptable reaction times. Further, as the operation should be carried out in the presence of a large excess of carbonated ammonia, the recovery of the ammonia is costly.

British Pat. No. 1,434,608 proposes a process which comprises the steps of combining brine or a like aqueous solution containing magnesium ions with a precipitating solution of ammonium carbonate containing $NH_3$ and $CO_2$ in stoichiometric quantities corresponding to the composition of ammonium carbonate, at atmospheric pressure, separating a precipitate of magnesium carbonate and magnesium hydroxide, recovering ammonia from the solution after separation of the precipitate, and recycling the said ammonia to prepare the precipitating solution. This process also suggests that control of the following parameters, i.e. temperature, ratio between the reagents (ammonium carbonate and magnesium ions), and the concentration of the magnesium solutions within certain specified limits is particularly important in order to obtain a very pure product in satisfactory yields. Thus this prior art process is accompanied by certain limitations which involve (i) the use of ammonium carbonate which is a costly reagent and (ii) the use of special equipment or machinery.

According to another known process, magnesium chloride dihydrate is dehydrated by a process in which the dehydration takes place in hydrochloric acid produced from the elements. The heat necessary for the dehydration of the magnesium chloride is supplied by the hydrogen chloride synthesis and by external heating. The hydrogen chloride synthesis is controlled in such a way that only as much hydrogen chloride is produced by synthesis as the water of the magnesium chloride dihydrate can absorb. In this dehydration reaction the reaction temperature is 300° to 400° C. This process is also not suitable as it involves complicated equipment.

British Pat. No. 1,426,567 also proposes a process for the production of hydrogen chloride and magnesium oxide from magnesium chloride in the presence of steam at elevated temperature as high as 2000° C., which involves costly and complicated equipment for thermal dissociation of magnesium chloride.

MgO can also be produced by treating $MgSO_4$ solution with $SO_2$ and heating the $Mg(HSO_3)_2$ so formed, which also is a costly process.

MgO (magnesium oxide) can also be obtained as the final product of thermal decomposition of numerous magnesium compounds. The conventional industrial processes for producing magnesium oxide include calcining magnesium carbonate or magnesium hydroxide and the thermal decomposition of magnesium chloride or sulphate. The material most commonly used in such a decomposition is magnesite i.e. naturally occurring magnesium carbonate or dolomite which consist essentially of a mixed carbonate of magnesium and calcium. The temperature necessary for rapid decomposition of magnesite is between 600° C. and 700° C., whereas dolomite decomposes rapidly at temperatures between 700° C. and 900° C. These known processes suffer from the disadvantage of requiring large quantities of the aforesaid minerals, i.e. magnesite and dolomite, as their raw materials, and these may evidently not always be easy to obtain in sufficiently pure form. Processes based on the decomposition of magnesium chloride or magnesium sulphate suffer from the disadvantage of requiring much higher decomposition temperature, i.e. temperatures which range between 1300° C. and 1700° C. in the case of decomposition of magnesium chloride and temperatures between 1100° C. and 1200° C. in the case decomposition of magnesium sulphate. More over the decomposition of magnesium sulphate must be generally conducted in a reducing atmosphere containing for example, sulphur, hydrogen sulphide, hydrogen or carbon monoxide with evident disadvantages deriving from the difficulty of operating the process at such high temperature in a very chemically reactive atmosphere which requires the use of special equipment.

Another process is known for obtaining hydrogen chloride and magnesium oxide from solutions or salts containing magnesium chloride in which hydrogen chloride is obtained by dissociation of the magnesium chloride in a flue gas current at a temperature of 1300° C. to 1400° C. Here the hot gas coming out from the dissociating furnace is used to concentrate the magnesium chloride-containing solution and to dry the magnesium chloride to the dihydrate. This process has the disadvantage that the product hydrogen chloride is present only in dilute form in mixture with water vapour and inert substance. For obtaining pure hydrogen chloride, an expensive purification process is subsequently necessary.

The present invention provides refractory grade pure magnesia (MgO) especially suitable for use in the manufacture of basic refractories.

This new process does not suffer from some or all of the aforesaid disadvantages associated with known processes for obtaining magnesium oxide from solutions containing magnesium ions, i.e. brine or bittern.

The new process totally avoids the precipitation of magnesium hydroxide from sea water and therefore the problem of increasing the speed of precipitation and obtaining a more easily filterable precipitate. The question of precipitation does not arise at all in the process of the present invention as the process results in the formation of a solidified mass which does not require precipitation and subsequent filtration.

The new process uses the minimum amount of calcined dolomite, calcined calcite/limestone, calcined magnesite, or a combination thereof, with brine or bittern as the source of magnesium ions.

The process of the present invention for the production of magnesium oxide from brine or bittern containing magnesium chloride comprises: (a) adding to the brine or bittern as a source of MgO and/or CaO, MgO or $Mg(OH)_2$ or calcined magnesite or calcined dolomite or calcined calcite/limestone in such amount that, in the case of MgO, $Mg(OH)_2$ or calcined magnesite, the molar ratio of $MgO:MgCl_2$ is in the range of 1:1.5 to 1:15 (i.e. 0.66:1 to 0.066:1) or in the case of calcined dolomite the molar ratio of $CaO+MgO:MgCl_2$ is in the range of 0.66:1 to 0.05:1 or in the case of calcined calcite the molar ratio of $CaO:MgCl_2$ is in the range of 0.66:1 to 0.1; (b) keeping the mixture at a temperature below 90° C. till a solid mass is formed; and (c) drying the said solid mass at a temperature of up to 200° C.; and optionally (d) calcining the dried mass at a maximum temperature of 1200° C., and optionally (e) briquetting the calcined mass into desired shapes with the addition of organic or inorganic binder, and firing the said briquettes at above 1400° C., preferably at above 1600° C.

Light calcined magnesite is preferably added as source of MgO to the bittern or brine.

When calcined magnesite is used the molar ratio of $MgO:MgCl_2$ is usually at least 1:10, preferably 1:4. In the new process any combination of calcined dolomite, calcined magnesite, and calcined calcite/limestone may be added to the brine or bittern, and the amount of any one of the components of such combination is such that the minimum molar ratio of (a) calcined dolomite to $MgCl_2$ is 0.02:1
(b) calcined calcite to $MgCl_2$ is 0.05:1 and
(c) calcined magnesite to $MgCl_2$ is 0.03:1

The concentration of the brine should be at least 20° Baume, and preferably above 25° Baume.

When briquettes are made the said binder is added in an amount of preferably up to 3% by wt. of the dried mass. An organic binder may be e.g. dextrine, molasses or sulphite lye, and an inorganic binder may be e.g. sodium chromate or chromic acid.

Optionally chromite or chrome ore is added in addition to the inorganic binder. This method involves the joint grinding and firing of the MgO—producing material with chromite or chrome ore. The fired clinker represents an excellent base material for the production of dense basic refractories with high hot strength properties.

The invention is illustrated by the following Examples.

EXAMPLE 1

An aqueous solution of $MgCl_2.6H_2O$ of a concentration of 27° Be was taken and to it light calcined Mgo of grain size below 1 mm was added in the ratio of $MgO:MgCl_2=1:4$. The mixture was stirred from time to time and a solid mass was formed in less than 24 hours. This solid mass was then dried at 110° C. and heated inside a furnace at 800° C. for 2 hours A fine powder of MgO was obtained and was analysed to have a purity of 99% MgO. The fine powder of MgO was mixed with sulphite lye and pressed and fired at 1600° C. The porosity of the final product (MgO) was found to be 10%.

EXAMPLE 2

An aqueous solution of $MgCl_2:6H_2O$ of a concentration of 27° Be was taken and to it light calcined MgO of grain size below 1 mm was added in such amount that the ratio of $MgO:MgCl_2$ was 1:2. The mixture was stirred from time to time when a solid mass was obtained in less than 24 hours. This solid mass was dried at 110° C. and heated inside a furnace at 800° C. for 2 hours. A fine powder of MgO was obtained and was analysed to have a purity of 99% MgO. The fine powder of MgO was mixed with sulphite lye and pressed and fired at 1600° C. The porosity of the final product (MgO) was tested and found to be 6%.

EXAMPLE 3

Commercial brine containing $MgCl_2$ of 34° Be was taken and $Mg(OH)_2$ was added in the molar ratio $MgO:MgCl_2=1:6$. Then it was stirred from time to time and a solid mass was obtained in less than 24 hours. The solid mass was fired at 800° C. when a fine powder of MgO was obtained with other impurities which were subsequently washed with water and found to have a purity of 99.5% MgO.

EXAMPLE 4

Commercial brine containing $MgCl_2$ of 34° Be was taken and heated to 85° C. and light calcined MgO of grain size below 1 mm was added in the molar ratio $MgO:MgCl_2 = 1:10$. Then it was stirred from time to time and a solid mass was obtained in less than 24 hours. This solid mass was fired at 800° C. A fine powder of MgO was obtained with other impurities which was subsequently washed with water to get a purity of 99.5% MgO.

EXAMPLE 5

Commercial brine containing $MgCl_2$ of 34° Be was taken and calcined dolomite of grain size below 1 mm was added to it in the molar ratio of calcined dolomite: $MgCl_2$ of 0.1:1. The mixture was stirred from time to time till a solid mass was obtained in less than 24 hours. The solid mass was dried at a temperature of 110°–120° C. and then taken inside a furnace where it was calcined at a temperature of 900° C. for 2 hours. A fine powder of MgO was obtained and washed with water. On analysis it was found to possess a purity of 98% MgO.

EXAMPLE 6

Commercial brine containing $MgCl_2$ of 34° Be was taken. Light calcined calcite of grain size below 1 mm was added to the brine in the molar ratio of calcined calcite:$MgCl_2$ of 0.17:1. The mixture was stirred from time to time and a solid mass was formed in less than 24 hrs. This solid mass was dried at 110°–120° C. and then taken inside a furnace where it was calcined at a temperature of 900° C. for 2 hours. A fine powder of MgO was obtained which was washed with water. On analysis it was found to possess a purity of 98% MgO.

EXAMPLE 7

Commercial brine containing $MgCl_2$ of 34° Be was taken. A mixture of light calcined magnesite and light calcined dolomite was added to the said brine in such amount that the molar ratio of calcined dolomite:$MgCl_2 = 0.03:1$ and calcined magnesite:$MgCl_2 = 0.04:1$. The mixture was stirred from time to time and a solid mass was formed in less than 24 hours. This solid mass was dried at 110°–120° C. and then taken inside a furnace where it was calcined at 900° C. for 2 hours. A fine powder of MgO was obtained which was washed with water. On analysis, it was found to possess a purity of 98% MgO.

EXAMPLE 8

Commercial brine containing $MgCl_2$ of 34° Be was taken. A mixture of light calcined dolomite and light calcined calcite was added to the said brine in such amount that the molar ratio of calcined dolomite:$MgCl_2 = 0.03:1$ and the molar ratio of calcined calcite:$MgCl_2 = 0.06:1$. The mixture was stirred from time to time and a solid mass was formed in less than 24 hours. The said solid mass was dried at 110°–120° C. and then calcined in a furnace at 900° C. for 2 hours. A fine powder of MgO was obtained which was washed with water. On analysis, it was found to possess a purity of 98% MgO.

EXAMPLE 9

Commercial brine containing $MgCl_2$ of 34° C. was taken. A mixture of calcined magnesite and light calcined calcite was added to the said brine in such amount that the molar ratio of calcined magnesite:$MgCl_2 = 0.04:1$ and the molar ratio of calcined calcite:$MgCl_2 = 0.06:1$. The mixture was stirred from time to time and a solid mass was formed in less than 24 hours. The said solid mass was dried at 110°–120° C. and then calcined inside a furnace at a temperature of 900° C. for 2 hours. A fine powder of MgO was obtained and washed water. On analysis, it was found to possess a purity of 98% MgO.

We claim:

1. A process for the production of magnesium oxide from brine or bittern containing magnesium chloride in a concentration of at least 25° Be consisting essentially of
   (a) adding to the brine or bittern, as a source of MgO and/or CaO, MgO or $Mg(OH)_2$ or calcined magnesite or calcined dolomite or calcined calcite/limestone in such amount that in the case of MgO, $Mg(OH)_2$ or calcined magnesite, the molar ratio of $MgO:MgCl_2$ is in the range of 1:1.5 to 1:15 (i.e. 0.66:1 to 0.066:1) or, in the case of calcined dolomite, the molar ratio of $MgO+CaO:MgCl_2$ is in the range of 0.66:1 to 0.05:1, or, in the case of calcined calcite/limestone, the molar ratio of $CaO:MgCl_2$ is in the range of 0.66:1 to 0.1:1;
   (b) keeping the mixture at a temperature below 90° C. till a solidified mass is formed; and
   (c) drying and calcining the said solid mass at a temperature up to 1200° C. to produce magnesium oxide powder.

2. A process according to claim 1 wherein the magnesium oxide powder obtained is washed.

3. A process for the production of magnesium oxide from brine or bittern containing magnesium chloride in a concentration of at least 25° Be consisting essentially of
   (a) adding to the brine or bittern, as a source of MgO and/or CaO, MgO or $Mg(OH)_2$ or calcined magnesite or calcined dolomite or calcined calcite/limestone in such amount that in the case of MgO, $Mg(OH)_2$ or calcined magnesite, the molar ratio of $MgO:MgCl_2$ is in the range of 1:1.5 to 1:15 (i.e. 0.66:1 to 0.066:) or, in the case of calcined dolomite, the molar ratio of $MgO+CaO:MgCl_2$ is in the range of 0.66:1 to 0.05:1, or, in the case of calcined calcite/limestone, the molar ratio of $CaO:MgCl_2$ is in the range of 0.66:1 to 0.1:1,
   (b) keeping the mixture at a temperature below 90° C. till a solidified mass is formed;
   (c) drying the said solid mass at a temperature up to 200° C.;
   (d) calcining the said mass at a maximum temperature of 1200° C.; and
   (e) briquetting the calcined mass into desired shapes with the addition of organic or inorganic binder, and firing the said briquettes at above 1400° C.

4. Process according to claim 3, in which the said briquettes are fired at above 1600° C.

5. A process according to claim 3, in which the said binder is added in amount of up to 3% by weight of the calcined mass.

6. A process according to claim 5, in which the binder is dextrine, molasses, sulphite lye, sodium chromate or chromic acid.

7. A process according to claim 3, which comprises the addition of chromite or chrome ore in addition to the binder.

8. A process according to claim 1 or 3, in which light calcined magnesite is added as a source of MgO to the brine or bittern.

9. A process according to claim 1 or 3, in which calcined magnesite is added to the brine or bittern in a molar ratio of $MgO:MgCl_2$ of at least 1:10 (0.1:1).

10. A process according to claim 9, in which the said molar ratio is 1:4 (0.25:1).

11. A process according to claim 1 or 3, in which any combination of calcined dolomite, calcined magnesite and calcined calcite/limestone is added to the brine or bittern, and the amount of any one of the components of such combination is such that the minimum molar ratio of:
    (a) calcined dolomite to $MgCl_2$ is 0.02:1;
    (b) calcined calcite to $MgCl_2$ is 0.05:1; and
    (c) calcined magnesite to $MgCl_2$ is 0.03:1.

12. A process for the production of magnesium oxide from brine or bittern containing magnesium chloride in a concentration of at least 25° Be consisting essentially of:
    (a) adding to the brine or bittern any combination of calcined dolomite, calcined magnesite, and calcined calcite/limestone in such amount that the minimum molar ratio of calcined dolomite to $MgCl_2$ is 0.02:1, calcined calcite to $MgCl_2$ is 0.05:1, and calcined magnesite to $MgCl_2$ is 0.03:1, the overall molar ratio of MgO to $MgCl_2$ being 0.066:1 to 0.66:1, of MgO+CaO to $MgCl_2$ being 0.05:1 to 0.66:1, and of CaO to $MgCl_2$ being 0.1:1 to 0.66:1;
    (b) keeping the mixture at a temperature below 90° C. until a solidified mass is formed; and
    (c) drying and calcining the said solid mass at a temperature up to 1200° C. to produce magnesium oxide powder.

13. A process for the production of basic refractory briquettes based on magnesium oxide consisting essentially of:
    (a) adding to a brine or bittern containing magnesium chloride in a concentration of at least 25° C. Be any combination of calcined dolomite, calcined magnesite, and calcined calcite/limestone in such amount that the minimum molar ratio of calcined dolomite to $MgCl_2$ is 0.02:1, calcined calcite to $MgCl_2$ is 0.05:1, and calcined magnesite to $MgCl_2$ is 0.03:1, the overall molar ratio of MgO to $MgCl_2$ being 0.066:1 to 0.66:1, of MgO+CaO to $MgCl_2$ being 0.05:1 to 0.66:1, and of CaO to $MgCl_2$ being 0.1:1 to 0.66:1;
    (b) keeping the mixture at a temperature below 90° C. until a solidified mass is formed;
    (c) drying the said solid mass at a temperature up to 200° C.;
    (d) calcining the said mass at a maximum temperature of 1200° C.; and
    (e) briquetting the calcined mass using an organic or inorganic binder, and firing the said briquettes at above 1400° C.

* * * * *